(12) United States Patent
Missotten et al.

(10) Patent No.: US 12,329,067 B2
(45) Date of Patent: Jun. 17, 2025

(54) REEL POWER SYSTEM

(71) Applicant: CNH Industrial America LLC, New Holland, PA (US)

(72) Inventors: Bart M. A. Missotten, Herent (BE); Bart Lenaerts, Zutendaal (BE); Cory Douglas Hunt, Millersville, PA (US); Pieter Van Overschelde, Sint-Andries (BE)

(73) Assignee: CNH Industrial America LLC, New Holland, PA (US)

( * ) Notice: Subject to any disclaimer, the term of this patent is extended or adjusted under 35 U.S.C. 154(b) by 915 days.

(21) Appl. No.: 17/385,236

(22) Filed: Jul. 26, 2021

(65) Prior Publication Data
US 2023/0026373 A1 Jan. 26, 2023

(51) Int. Cl.
| | | |
|---|---|---|
| *A01D 57/03* | (2006.01) | |
| *A01D 41/14* | (2006.01) | |
| *A01D 57/04* | (2006.01) | |
| *A01D 69/02* | (2006.01) | |
| *A01D 69/03* | (2006.01) | |

(52) U.S. Cl.
CPC .......... *A01D 57/03* (2013.01); *A01D 41/141* (2013.01); *A01D 41/142* (2013.01); *A01D 57/04* (2013.01); *A01D 69/02* (2013.01); *A01D 69/03* (2013.01)

(58) Field of Classification Search
CPC .... A01D 41/141; A01D 41/142; A01D 57/02; A01D 57/03; A01D 57/04; A01D 69/02; A01D 69/03
See application file for complete search history.

(56) References Cited

U.S. PATENT DOCUMENTS

| | | | |
|---|---|---|---|
| 6,430,902 B1* | 8/2002 | Saiia | A01D 34/58 |
| | | | 56/7 |
| 6,698,175 B1 | 3/2004 | Schumacher et al. | |
| 7,121,495 B2 | 10/2006 | Caamano | |
| 7,894,957 B2 | 2/2011 | Carlson | |
| 10,188,035 B2 | 1/2019 | Reich et al. | |
| 10,531,603 B2 | 1/2020 | Ferrari et al. | |
| 2007/0296276 A1* | 12/2007 | Blackman | H02M 5/32 |
| | | | 307/64 |
| 2020/0214208 A1 | 7/2020 | Shearer | |
| 2020/0215922 A1* | 7/2020 | Sawata | B60L 50/15 |
| 2020/0245560 A1 | 8/2020 | Legault et al. | |

(Continued)

FOREIGN PATENT DOCUMENTS

| | | |
|---|---|---|
| JP | 2010273561 | 12/2010 |
| KR | 20180125262 | 11/2018 |

OTHER PUBLICATIONS

International Search Report and Written Opinion for Application No. PCT/US2022/038198 dated Nov. 7, 2022 (11 pages).

*Primary Examiner* — Christopher J Sebesta
*Assistant Examiner* — Robert E Pezzuto
(74) *Attorney, Agent, or Firm* — Peter K. Zacharias

(57) ABSTRACT

A reel power system for a header of an agricultural system includes an electrical generator having a stator and a rotor rotatably engaged with the stator. The stator is configured to be non-rotatably coupled to a support structure of a reel of the header. The rotor is configured to non-rotatably engage a base of the header. Furthermore, the reel is configured to rotate relative to the base. The electrical generator is configured to generate electrical power in response to rotation of the rotor.

18 Claims, 5 Drawing Sheets

(56) References Cited

U.S. PATENT DOCUMENTS

2020/0275609 A1    9/2020   Drzal
2021/0055158 A1    2/2021   Hunt et al.
2021/0120740 A1    4/2021   Martin et al.
2022/0377981 A1*  12/2022   Laugen .................... B60P 3/00

* cited by examiner

REEL POWER SYSTEM

BACKGROUND

This section is intended to introduce the reader to various aspects of art that may be related to various aspects of the present disclosure, which are described or claimed below. This discussion is believed to be helpful in providing the reader with background information to facilitate a better understanding of the various aspects of the present disclosure. Accordingly, it should be understood that these statements are to be read in this light, and not as admissions of prior art.

A harvester may be used to harvest crops. The harvester may include a header, which may be positioned at the front of the harvester to collect crops. The header may include a reel. The reel may include a central framework, tines may be non-rotatably coupled to the central framework, and the reel may be configured to rotate. To enhance the performance of harvesting operations, sensor data (e.g., data pertaining to crops or soil in front of the header) may be used by a controller to control the harvesting operations. For example, the controller may control components (e.g., the reel, etc.) of the header. Unfortunately, the structures for mounting sensors to the header may be complex and expensive, thereby increasing the cost of the header.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a reel power system for a header of an agricultural system includes an electrical generator having a stator and a rotor rotatably engaged with the stator. The stator is configured to be non-rotatably coupled to a support structure of a reel of the header. The rotor is configured to non-rotatably engage a base of the header. Furthermore, the reel is configured to rotate relative to the base. The electrical generator is configured to generate electrical power in response to rotation of the rotor.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
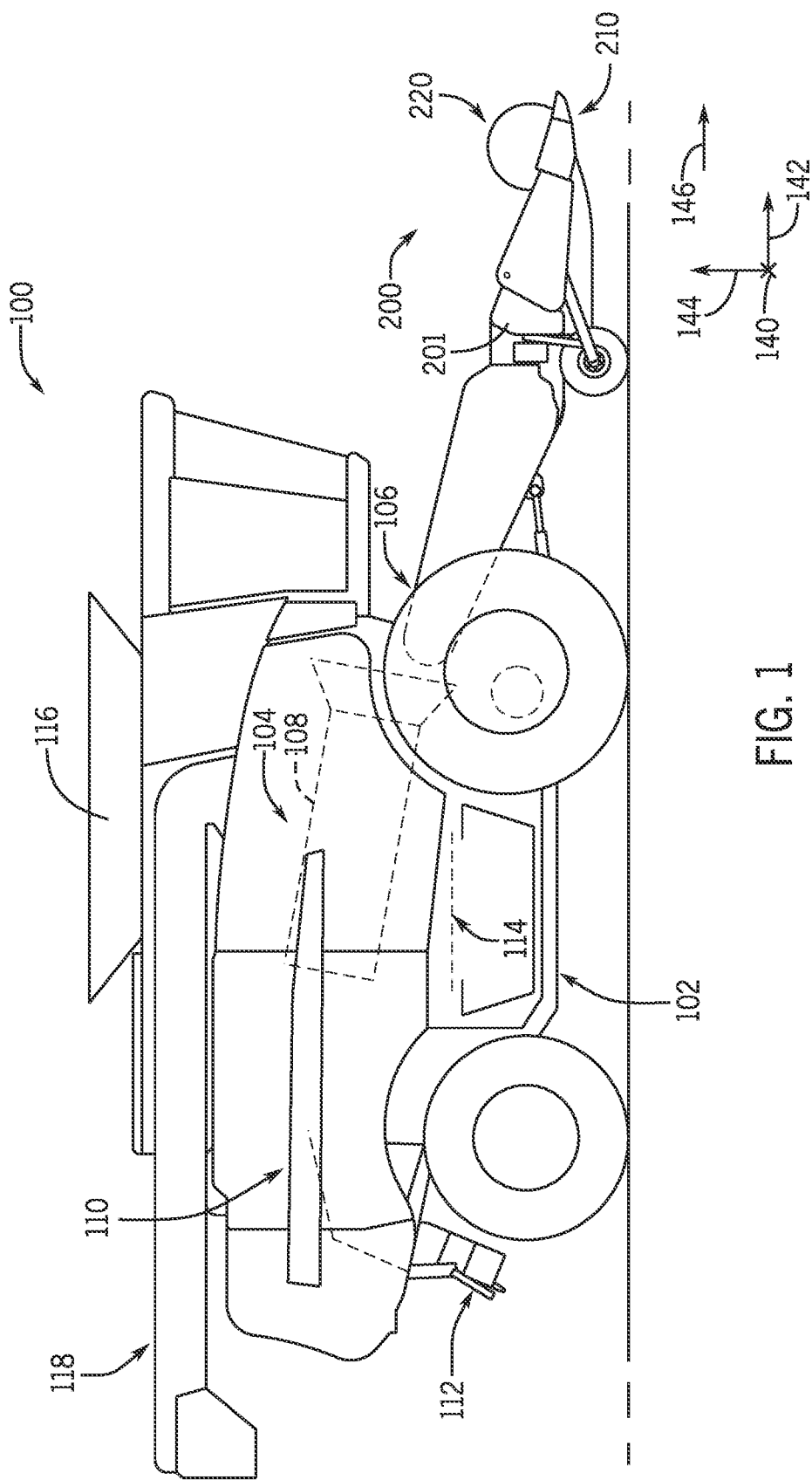
FIG. 1 is a side view of an embodiment of an agricultural system, in accordance with an embodiment described herein.

One or more specific embodiments will be described below. To provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

The combine harvester is the cornerstone of modern, mechanized agriculture. The combine greatly simplifies the agricultural process by combining several harvesting operations—reaping, threshing, gathering, and winnowing—into one, overall process. To perform these operations, combines may include a header. The header is positioned at the front of the combine and interacts with crops to perform harvesting operations. To interact with the crops, the header may include a reel. The reel may include a central framework, tines may be non-rotatably coupled to the central framework, and the reel may rotate to interact with (e.g., facilitate collection of) crops.

Sensor(s) may provide data that facilitates harvesting operations. For example, data sensed from the front of the header may be used to position the reel relative to the header frame and/or to vary the rotational speed of the reel. Controlling the position and/or rotation speed of the reel may enable the tines to collect and/or guide crops effectively. For example, the reel may be dynamically positioned according to such data to reduce crop accumulation in the header and to, thus, ensure that a crop processing system of the combine is consistently fed. However, the benefits of adding sensors may be mitigated if the complexity and the costs of the combine are prohibitively increased. Indeed, adding additional frame(s) and/or infrastructure to the header to support the sensor(s) may reduce the effectiveness of the combine while increasing the cost of its manufacture. Accordingly, systems directed toward a reel power system that is relatively simple, cost effective, and enables sensor(s) to be mounted on the reel may be desirable for both manufacturers and consumers alike.

Keeping the foregoing in mind, the present disclosure is directed toward a reel power system that incorporates electrical generator(s) (e.g., dynamo(s), alternator(s), etc.). The electrical generator(s) may generate electricity from the rotation of the reel. In certain embodiments, the electrical generator(s) may provide the generated electricity to one or more sensors mounted on the reel. In some embodiments, the sensor(s) may gather data pertaining to crops and/or soil in front of the header. In some embodiments, the sensor(s) may wirelessly transmit the data to a controller.

With this in mind, non-rotatably coupling stator(s) of respective electrical generator(s) to the reel may enable the sensor(s) to be mounted to the reel, thereby obviating structures that support the sensor(s) on the header frame. In addition, because the reel power system includes electrical generator(s) having respective stator(s) non-rotatably coupled to the reel, an electrical power system that provides electrical power to the header from an electrical generator mounted on the combine chassis may be obviated. As a result, the combine may include sensor monitoring without prohibitively increasing the mechanical complexity and the manufacturing cost of the header and combine. Thus, the embodiments described herein may increase the performance of combine harvesters, improve agricultural productivity, and reduce production costs. Additional details regarding systems and processes of a reel power system will be discussed below in reference to FIGS. 1-5.

By way of introduction, FIG. 1 is a side view of an embodiment of an agricultural system 100, which may be a harvester. The agricultural system 100 includes a chassis 102 configured to support a header 200 and an agricultural crop processing system 104. As described in greater detail below, the header 200 is configured to cut crops and to transport the cut crops toward an inlet 106 of the agricultural crop processing system 104 for further processing of the cut crops. The agricultural crop processing system 104 receives the cut crops from the header 200 and separates desired crop material from crop residue. For example, the agricultural crop processing system 104 may include a thresher 108 having a cylindrical threshing rotor that transports the crops in a helical flow path through the agricultural system 100. In addition to transporting the crops, the thresher 108 may separate certain desired crop material (e.g., grain) from the crop residue, such as husks and pods, and may enable the desired crop material to flow into a cleaning system 114 (such as sieves) located beneath the thresher 108. The cleaning system 114 may remove debris from the desired crop material and transport the desired crop material upward via an elevator to a storage tank 116 within the agricultural system 100. When the storage tank 116 is full, a tractor towing a trailer may pull alongside the agricultural system 100. The desired crop material collected in the storage tank 116 may be carried and expelled from an unloader 118 into the trailer. The crop residue may be transported from the thresher 108 to a crop residue handling system 110, which may process (e.g., chop/shred) and remove the crop residue from the agricultural system 100 via a crop residue spreading system 112 positioned at an aft end of the agricultural system 100. To facilitate discussion, the agricultural system 100 and components of the agricultural system may be described with reference to a lateral axis or direction 140, a longitudinal axis or direction 142, and a vertical axis or direction 144. The agricultural system 100 and components of the agricultural system may also be described with reference to a direction of travel 146.

As discussed in detail below, the header 200 includes a cutter bar assembly 210 configured to cut the crops within the field. The header 200 also includes a reel assembly 220 configured to engage the crops to prepare the crops to be cut by the cutter bar assembly 210. The reel assembly 220 may also be configured to place crops cut by the cutter bar assembly 210 onto a conveyor system that directs the cut crops toward the inlet 106 of the agricultural crop processing system 104. The reel assembly 220 includes a reel having multiple tines (e.g., fingers) extending from a central framework. The central framework is driven to rotate such that the tines engage the crops and urge the crops toward the cutter bar assembly 210 and the conveyor system. Additionally, the reel may be supported by multiple arms (e.g., reel arms) that are non-rotatably coupled to a frame 201 of the header 200. Each of the arms may be non-rotatably coupled to the frame 201 via a respective pivot joint. For example, one pivot joint is configured to enable a first arm of the multiple arms to pivot (e.g., about the lateral axis 140) relative to the frame 201, and another pivot joint is configured to enable a second arm of the multiple arms to pivot (e.g., about the lateral axis 140) relative to the frame 201.

Figure 2:
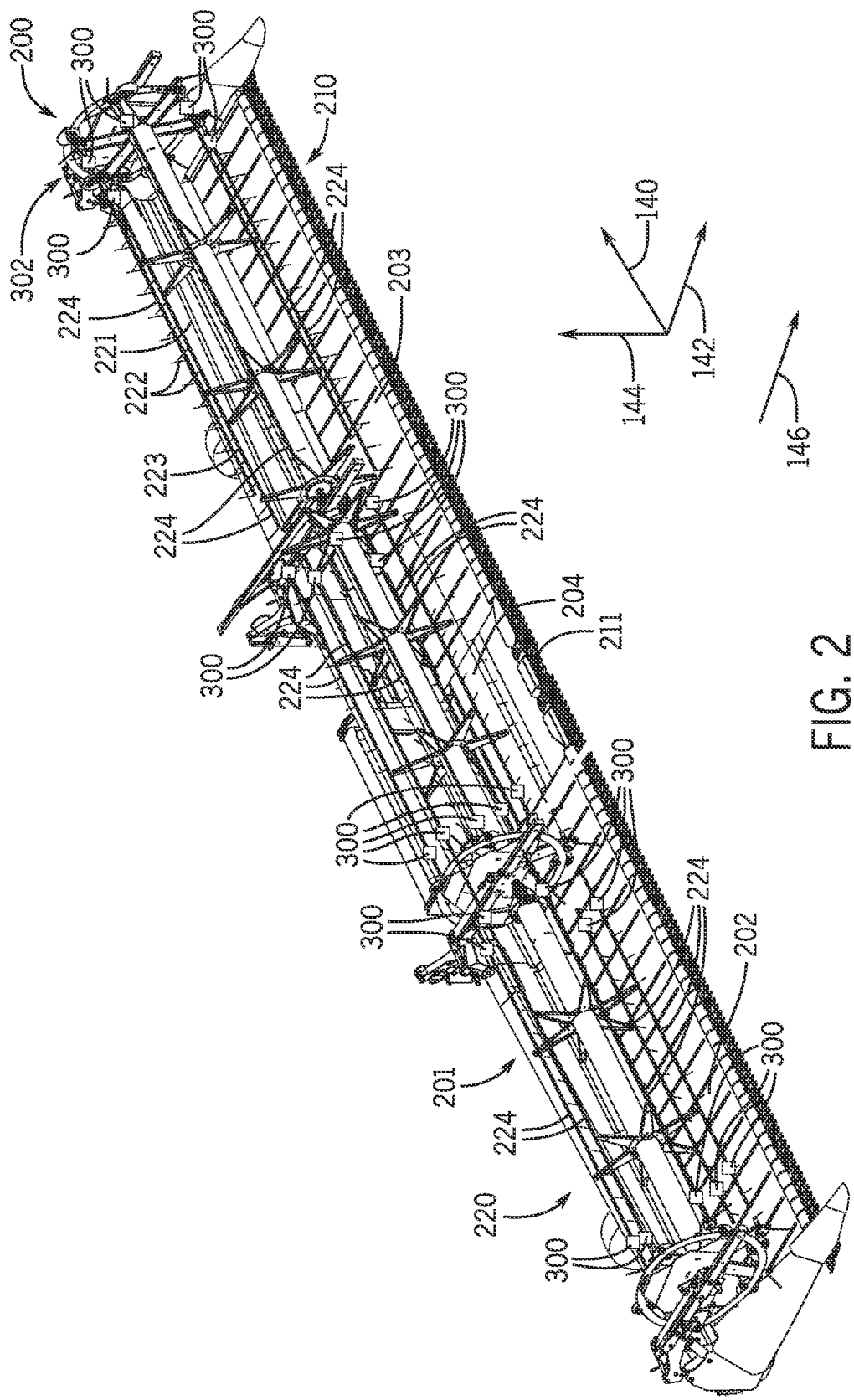
FIG. 2 is a perspective view of an embodiment of a header that may be employed within the agricultural system of FIG. 1, in accordance with an embodiment described herein.

FIG. 2 is a perspective view of an embodiment of a header 200 that may be employed within the agricultural system of FIG. 1. In the illustrated embodiment, the header 200 includes the cutter bar assembly 210 configured to cut a portion of each crop (e.g., a stalk) thereby separating the crop from the soil. The cutter bar assembly 210 is positioned at a forward end of the header 200 relative to the longitudinal axis 142 of the header 200. As illustrated, the cutter bar assembly 210 extends along a substantial portion of the width of the header 200 (e.g., along the lateral axis 140). The cutter bar assembly 210 includes a blade support, a stationary guard assembly, and a moving blade assembly. The moving blade assembly is fixed to the blade support (e.g., above the blade support along the vertical axis 144 of the header 200), and the blade support/moving blade assembly is driven to oscillate relative to the stationary guard assembly. In the illustrated embodiment, the blade support/moving blade assembly is driven to oscillate by a driving mechanism 211 positioned at a center of the header 200. However, in other embodiments, the blade support/moving blade assembly may be driven by another suitable mechanism (e.g., located at any suitable position on the header 200). As the agricultural system is driven through the field, the cutter bar assembly 210 engages crops within the field, and the moving blade assembly cuts the crops (e.g., the stalks of the crops) in response to engagement of the cutter bar assembly 210 with the crops.

In the illustrated embodiment, the header 200 includes a first conveyor section 202 on a first lateral side of the header 200 and a second conveyor section 203 on a second lateral side of the header 200, opposite the first lateral side. The conveyor sections 202, 203 may be separate from one another. For instance, the first conveyor section 202 may extend along a portion of a width of the header 200, and the second conveyor section 203 may extend along another portion of the width of the header 200. Each conveyor section 202, 203 is driven to rotate by a suitable drive mechanism, such as an electric motor or a hydraulic motor. The first conveyor section 202 and the second conveyor section 203 are driven such that a top surface of each conveyor section 202, 203 moves laterally inward to a center conveyor section 204 positioned between the first conveyor section 202 and the second conveyor section 203 along the lateral axis 140. The center conveyor section 204 may also be driven to rotate by a suitable drive mechanism, such as an electric motor or a hydraulic motor. The center conveyor section 204 is driven such that the top surface of the center conveyor section 204 moves rearwardly relative to the direction of travel 146 toward the inlet. As a result, the conveyor sections 202, 203, 204 transport the cut crops to the inlet of the agricultural crop processing system 100 for further processing of the cut crops. Although the illustrated header 200 includes two conveyor sections 202, 203 configured to direct crops toward the center conveyor section 204, there may be any suitable number of conveyor sections in additional or alternative embodiments directing the crops toward the center conveyor section.

In the illustrated embodiment, the crops cut by the cutter bar assembly 210 are directed toward the conveyor sections 202, 203 at least in part by the reel assembly 220, thereby substantially reducing the possibility of the cut crops falling onto the surface of the field. The reel assembly 220 includes a reel 221 having multiple fingers or tines 222 extending from a central framework 223. The central framework 223 is driven to rotate such that the tines 222 move (e.g., in a circular pattern). The tines 222 are configured to engage the crops and to urge the cut crops toward the conveyor sections 202, 203 to facilitate transportation of the cut crops to the agricultural crop processing system. Additionally, electrical generator(s) 300 of a reel power system 302 may be non-rotatably coupled to the central framework 223, as discussed in detail below.

As illustrated herein, the cutter bar assembly 210 is flexible along the width of the header 200. The cutter bar assembly 210 is supported by multiple arm assemblies distributed along the width of the header 200. In some embodiments, the frame 201 of the header 200 may be movably non-rotatably coupled to the chassis of the agricultural system. Each arm assembly is mounted to the frame 201 and includes an arm non-rotatably coupled to the cutter bar assembly 210. The arm may rotate or move the cutter bar assembly 210 along the vertical axis 144 relative to the frame 201, thereby enabling the cutter bar assembly 210 to flex during operation of the agricultural system. Thus, the cutter bar assembly 210 may follow the contours of the field, thereby enabling the cutting height (e.g., the height at which each crop is cut) to be substantially constant along the width of the header 200.

Figure 3:
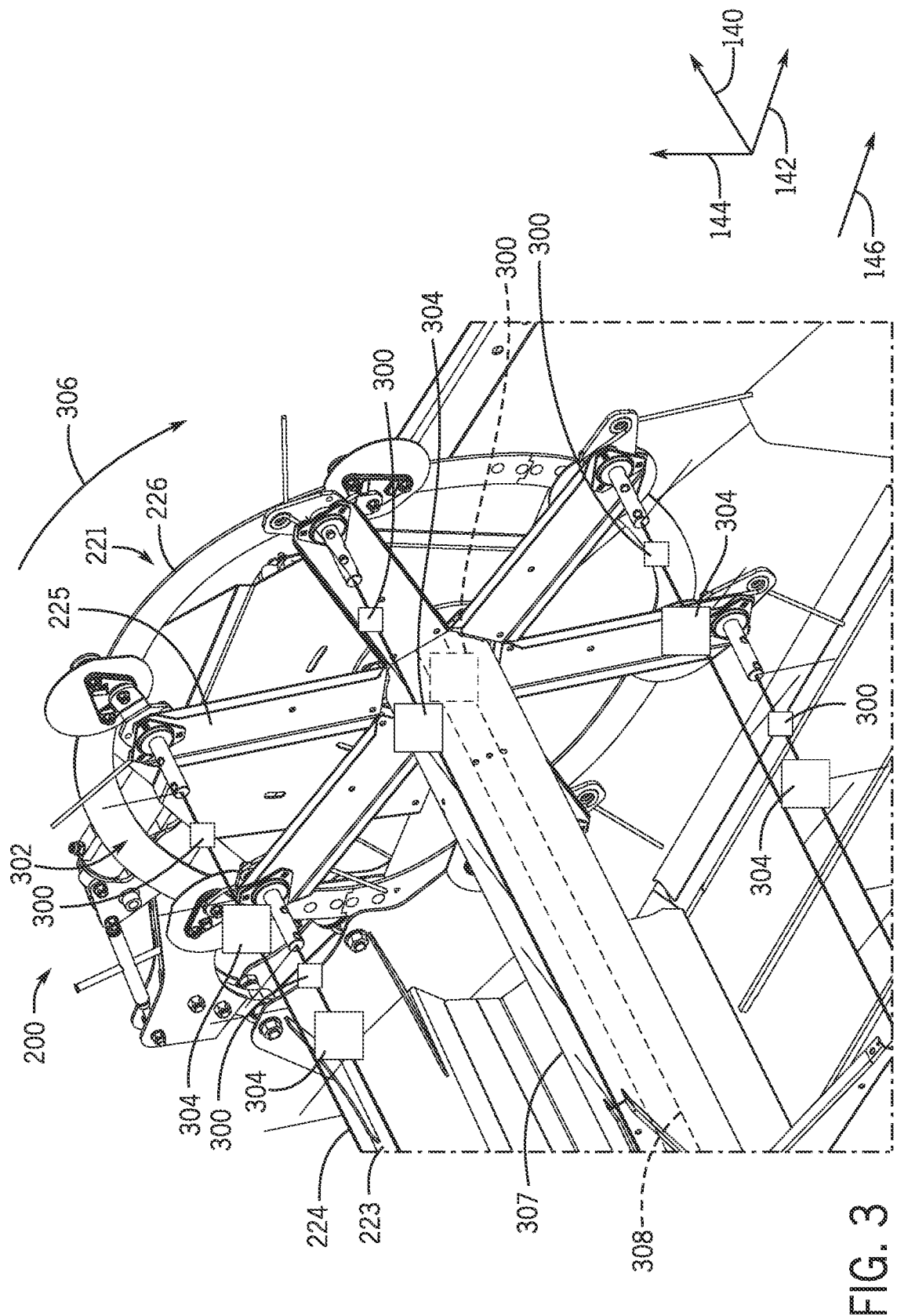
FIG. 3 is a perspective view of a portion of an embodiment of a reel power system that may be employed within the header of FIG. 2, in accordance with an embodiment described herein.

FIG. 3 is a perspective view of a portion of an embodiment of a reel power system 302 that may be employed within the header 200 of FIG. 2. As illustrated herein, the reel power system 302 may include structural components such as the reel 221, the central framework 223, spoke(s) 225 of the central framework 223, and a reel center tube 307 of the central framework 223. Continuing, sensor(s) 304 (e.g., of the reel power system 302) may be mounted to the central framework 223. In the illustrated embodiment, each sensor 304 is mounted to a reel tine bar 224 of the central framework 223. However, in other embodiments, at least one sensor 304 may be mounted to another suitable portion of the reel 221 (e.g., to the reel center tube 307 of the central framework 223, to the spoke(s) 225 of the central framework 223, etc.). The sensor(s) 304 may include light detection and ranging (LIDAR) sensor(s), radio detection and ranging (radar) sensors(s), optical sensor(s) (e.g., camera(s), etc.), other suitable type(s) of sensor(s), or a combination thereof. Each sensor 304 may point generally toward the ground ahead of the header 200 throughout a portion of the rotational range of motion of the reel (e.g., in embodiments in which the sensor is mounted to the reel center tube or the spoke(s)) and/or a portion of the rotational range of motion of the respective reel tine bar 224 (e.g., in embodiments in which the sensor is mounted to the respective reel tine bar 224). The reel power system 302 may have any suitable number of sensors 304 (e.g., 0, 1, 2, 3, 4, 5, 6, 7, 8, 9, 10, or more). For example, at least one sensor may be mounted to each reel tine bar 224.

The reel 221 may be configured to rotate along a rotational direction 306 (e.g., about lateral axis 140). As previously discussed, the reel 221 includes the central framework 223 and tines 222 non-rotatably coupled to the central framework 223. The central framework 223 includes the reel center tube 307, the spokes 225 non-rotatably coupled to the reel center tube 307, and multiple reel tine bars 224 rotatably coupled to the spokes 225. As illustrated, the tines 222 are non-rotatably coupled to the reel tine bars 224. In the illustrated embodiment, the reel 221 includes a center shaft 308 extending through an interior of the reel center tube 307 along the lateral axis 140. The center shaft 308 is non-rotatably coupled to the reel center tube 307. In certain embodiments, the center shaft 308 is non-rotatably coupled to a drive system (e.g., including a hydraulic motor, etc.). The drive system drives the center shaft 308 to rotate along the rotational direction 306, thereby causing the reel center tube 307, the spokes 225, and the reel tine bars 224 to rotate in the rotational direction 306. The reel center tube 307, the spokes 225, and the reel tine bars 224 may be driven to rotate relative to a base of the header. In addition, components fixed to the reel 221 (e.g., sensor(s) 304 and electrical generator(s) 300) may, thus, be driven to rotate along the rotational direction 306. Furthermore, in certain embodiments, the reel includes a cam system 226 configured to drive the reel tine bars 224 to rotate about respective reel tine bar rotational axes in response to rotation of the central framework 223. Accordingly, components fixed to the reel tine bars (e.g., sensor(s) 304, electrical generator(s) 300, etc.) may rotate with the reel tine bars about the respective reel tine bar rotational axes.

Figure 4:
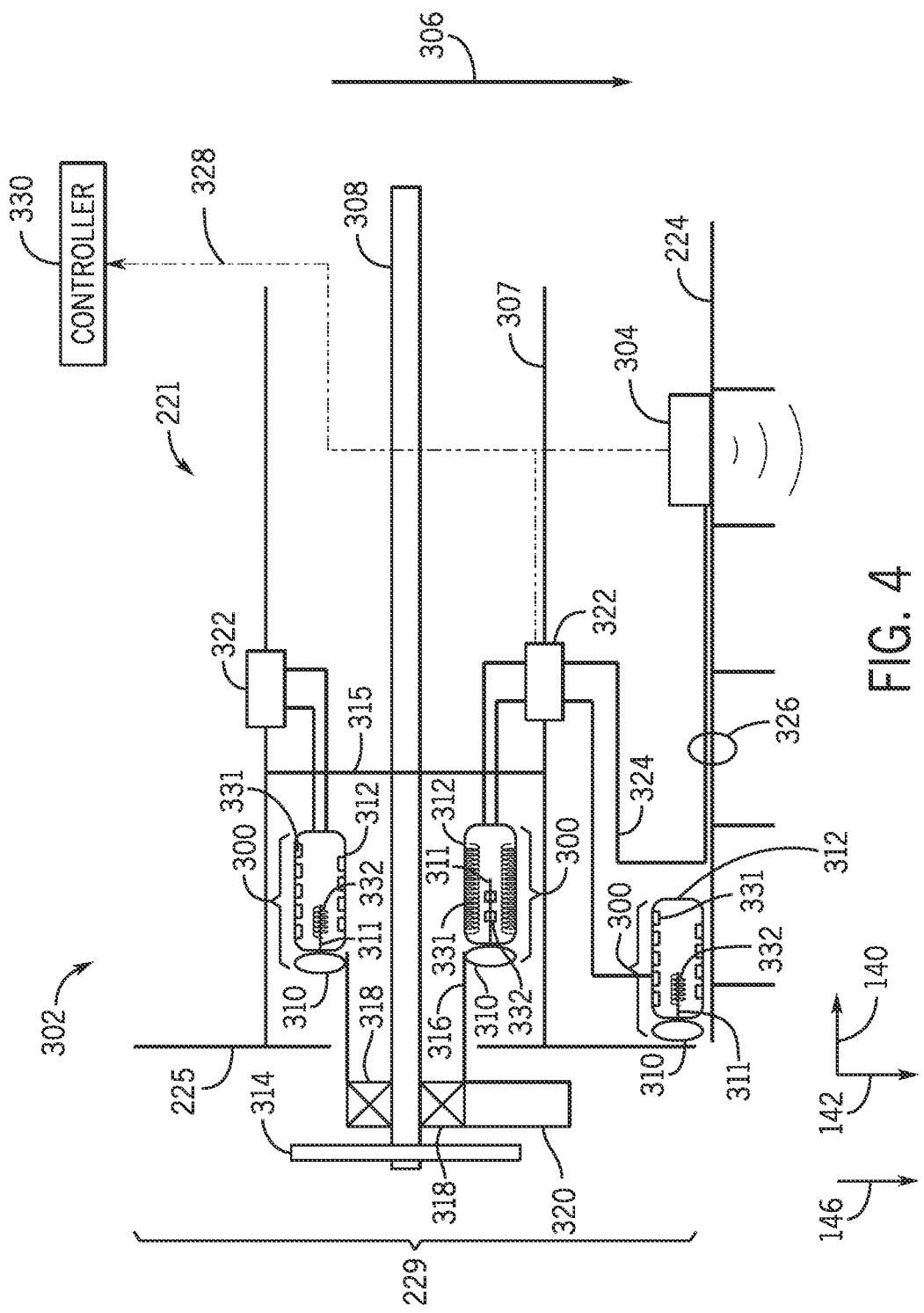
FIG. 4 is a schematic view of an embodiment of a reel power system that may be employed within the header of FIG. 2, in accordance with an embodiment described herein.

FIG. 4 is a schematic view of an embodiment of a reel power system 302 that may be employed within the header 200 of FIG. 2. To drive the reel 221 to rotate, a suitable drive mechanism, such as an electric motor or a hydraulic motor, may drive a chain driven sprocket 314 to rotate along the rotational direction 306 (e.g., about the lateral axis 140). The chain driven sprocket 314 may drive the center shaft 308 to rotate along the rotational direction 306. In the illustrated embodiment, the center shaft 308 is non-rotatably coupled to the reel center tube 307 by connector(s) 315. The reel 221 includes a support structure 229 that rotatably supports the tine bars. In the illustrated embodiment, the support structure 229 includes the center shaft 308, the connector(s) 315, the spoke(s) 225, and the reel center tube 307. In some embodiments, certain component(s) (e.g., the reel center tube 307, etc.) may be omitted from the support structure. As previously discussed, the spokes 225 are non-rotatably coupled to the reel center tube 307, and the reel tine bars 224 are rotatably coupled to the spokes 225. Accordingly, the center shaft 308, the connector(s) 315, the reel center tube 307, the spokes 225, and the reel tine bars 224 are driven to rotate along the rotational direction 306. While the center shaft 308 is driven to rotate by a chain driven sprocket 314 in the illustrated embodiment, in other embodiments, the center shaft may be driven to rotate by any other suitable device.

In the illustrated embodiment, the center shaft 308 is rotatably supported by one or more side reel bearings 318. As illustrated, the side reel bearings 318 are positioned between a tubular structure 316 and the center shaft 308, thereby enabling the center shaft 308, the reel 221, and the reel tine bars 224 to rotate relative to the tubular structure 316. In addition, the tubular structure 316 is non-rotatably coupled to a reel support arm 320, and the reel support arm 320 is non-rotatably coupled to the frame 201 of the header 200. In certain embodiments, a base of the header may include the tubular structure 316, the reel support arm 320, and the frame 201. The reel support arm 320 is configured to support the reel 221 and to control the position of the reel 221 relative to the header frame 201. While side reel bearing(s) 318 are positioned between the tubular structure 316 and the center shaft 308 in the illustrated embodiment, in other embodiments, the side reel bearing(s) may be omitted (e.g., and another suitable device, such as a bushing, may be disposed between the tubular structure 316 and the center shaft 308). In some embodiments, the reel support arm 320 may be omitted, and the tubular structure 316 may be non-rotatably coupled to the frame 201 of the header 200. In such embodiments, the base of the header may include the frame and the tubular structure.

In the illustrated embodiment, electrical generators 300 are mounted on the reel center tube 307. Each electrical generator 300 includes a wheel 310, a shaft 311, and a body 312. The wheel 310 is non-rotatably coupled to the shaft 311, and the shaft 311 is rotatably coupled to the body 312. Accordingly, the wheel 310 is configured to rotate relative to the body 312. In addition, the body 312 is non-rotatably coupled to the reel center tube 307, and the wheel 310 is configured to contact the tubular structure 316. Accordingly, as the reel 221 rotates relative to the tubular structure 316, the wheel 310 is driven to rotate relative to the body 312. In the illustrated embodiment, each wheel 310 is engaged with an exterior of the tubular structure 316. In certain embodiments, the wheel of at least one electrical generator 300 may be disposed within the tubular structure 316. In this way, the wheel(s) 310 may be configured to contact the inner surface of the tubular structure 316. As mentioned, as the reel 221 rotates relative to the tubular structure 316, the wheel 310 is driven to rotate relative to the body 312. The body of each electrical generator 300 may be non-rotatably coupled to any suitable part the support structure of the reel 221. For example, the body of at least one electrical generator 300 may be non-rotatably coupled to the reel center tube 307 of the central framework 223, to the spoke(s) 225 of the central framework 223, or the like. Furthermore, in certain embodiments, the exterior surface of the wheel may be substantially smooth and configured to engage a corresponding substantially smooth surface of the tubular structure. However, in other embodiments, the exterior surface of the wheel may have teeth configured to engage corresponding teeth of the tubular structure.

Each electrical generator 300 includes a stator 331 and a rotor 332 rotatably engaged with the stator 331. In some embodiments (e.g., in embodiments in which the electrical generator 300 is a dynamo), one or more metal wires (e.g., coiled wire(s)), which form the rotor 332, may be non-rotatably coupled to the shaft 311. In addition, one or more permanent magnets, which form the stator 331, may be non-rotatably coupled to the body 312. In certain other embodiments (e.g., in embodiments in which the electrical generator 300 is an alternator), one or more permanent magnets, which form the rotor 332 may be non-rotatably coupled to the shaft 311. In addition, one or more metal wires (e.g., coiled wire(s)), which form the stator 331, may be non-rotatably coupled to the body 312. Because the body 312 is non-rotatably coupled to the support structure of the reel, the stator 331 is non-rotatably coupled to the support structure of the reel. Furthermore, because the rotor 332 is non-rotatably coupled to the shaft, and the shaft is non-rotatably coupled to the wheel, the wheel is non-rotatably coupled to the rotor 332. Accordingly, the rotor 332 is non-rotatably engaged with the base of the header (e.g., the tubular structure of the base of the header). As the wheel 310 is driven to rotate, the shaft 311 is driven to rotate by the wheel 310, thereby driving the rotor 332 to rotate. The rotation of the rotor 332 relative to the stator 331 may generate electrical power, which is output by the stator 331 of the electrical generator 300.

In the illustrated embodiment, the stator 331 and the rotor 332 are disposed within the body of the electrical generator 300. However, in other embodiments, the body may be omitted, and the stator 331 may be non-rotatably coupled (e.g., directly non-rotatably coupled) to the support structure of the reel. Additionally or alternatively, in certain embodiments, the wheel may be omitted, and the rotor 332 may be non-rotatably coupled (e.g., directly non-rotatably coupled, non-rotatably coupled via the shaft, etc.) to the base of the header. While the reel power system 302 includes two electrical generators 300 engaged with the base of the header in the illustrated embodiment, in other embodiments, the reel power system may include more or fewer generators 300 engaged with the base of the header.

Furthermore, in the illustrated embodiment, each electrical generator 300 is electrically coupled to a voltage regulator 322. The electrical generator(s) 300 and the voltage regulator(s) 322 may be connected via conductors, such as wire(s), integrated circuit(s), etc. Each voltage regulator 322 may receive electrical power from one or more electrical generators 300, and the voltage regulator 322 may be configured to regulate the electrical power to provide a target electrical power (e.g., current and voltage) to the sensor(s) 304. Regulating (e.g., adjusting) the electrical power may include adjusting properties of the electrical power such as the frequency, the voltage, the current, or a combination thereof. For example, in some embodiments the voltage regulator 322 may convert AC current from an electrical generator 300 to DC current for the sensor(s) 304. Furthermore, in some embodiments, at least one voltage regulator 322 may wirelessly output voltage and/or current data (e.g., via Bluetooth, radio frequency, etc.). In certain embodiments, regulating the electrical power may include energy storage. For example, at least one voltage regulator may include a battery configured to store energy to provide a buffer for energy generation and changing loads. Each voltage regulator 322 may be electrically coupled to one or more electrical generators 300, and/or each electrical generator 300 may be electrically coupled to one or more voltage regulators. While the reel power system 302 includes two voltage regulators in the illustrated embodiment, in other embodiments, the reel power system 302 may include more or fewer voltage regulators. For example, in certain embodiments, the voltage regulators may be omitted (e.g., and the electrical generator(s) 300 may be directly electrically coupled to the sensor(s) 304).

The sensor(s) 304 may receive electrical power from the voltage regulator(s) 322. In some embodiments, the electrical power may be in the form of direct current (DC) voltage. The electrical power may power the sensor(s) 304, and the electrical power may be provided to each sensor by conductors (e.g., wire(s), integrated circuit(s) (IC), etc.), extending from a voltage regulator to the sensor. In some embodiments (e.g., in embodiments in which sensor(s) are non-rotatably coupled to the reel center tube and/or to the spoke(s)), the conductors may extend directly from the voltage regulator(s) to the sensor(s). In some embodiments (e.g., in embodiments in which sensor(s) are non-rotatably coupled to the reel tine bar(s)), slip ring(s) 326 may be utilized to establish the electrical connection between the voltage regulator(s) 322 and the sensor(s) 304. Each slip ring 326 may provide a continuous electrical connection between rotating component(s) (e.g., the sensor(s) 304) and stationary component(s) (e.g., the voltage regulator(s) 322). For example, as previously discussed, a sensor 304 may be non-rotatably coupled to a reel tine bar 224, which rotates relative to the reel center tube 307 and the spokes 225. Accordingly, the slip ring 326 facilitates establishment of an electrical connection between a voltage regulator, which is non-rotatably coupled to the reel center tube 307, and a sensor 304, which is non-rotatably coupled to the reel tine bar 224.

Furthermore, the sensor(s) 304 may include light detection and ranging (LIDAR) sensor(s), radio detection and ranging (radar) sensors(s), optical sensor(s) (e.g., camera(s), etc.), other suitable type(s) of sensor(s), or a combination thereof. Each sensor 304 may point generally toward the ground ahead of the header 200 throughout a portion of the rotational range of motion of the reel 221 (e.g., in embodiments in which the sensor 304 is mounted to the reel center tube or the spoke(s)) and/or a portion of the rotational range of motion of the respective reel tine bar 224 (e.g., in embodiments in which the sensor 304 is mounted to the respective reel tine bar 224). The sensor(s) 304 may be configured to wirelessly transmit data to a controller 330. The sensor(s) 304 may transmit the data via Bluetooth, a radio frequency, or the like. The reel power system 302 may include any suitable number of sensors 304 (e.g., 0, 1, 2, 3, 4, 5, 6, or more), and each sensor 304 may be non-rotatably coupled to any suitable portion of the reel 221.

The controller 330 may receive data from the voltage regulator(s) 322 and the sensor(s) 304. In some embodiments, the data may be received wirelessly (e.g., via Bluetooth, radio frequency, etc.). With data from the voltage regulator(s) 322, the controller 330 may determine whether the electrical generator(s) 300 are outputting sufficient electrical power and/or whether the sensor(s) are receiving sufficient electrical power. For instance, in some embodiments, the controller 330 may receive the data indicative of the amount of electrical power generated by the electrical generator(s) 300. The controller 330 may determine whether the amount of electrical power being generated by the electrical generator(s) 300 is sufficient (e.g., above a threshold value). Furthermore, in some embodiments, the controller 330 may receive data indicative of the amount of electrical power that the voltage regulator(s) 322 are providing to the sensor(s) 304. The controller 330 may determine whether the sensor(s) 304 are receiving sufficient electrical power (e.g., above a threshold value). In response to determining that the electrical power output by the electrical generator(s) 300 and/or the electrical power received by the sensor(s) 304 is insufficient, the controller 330 may disable operation of the sensor(s) 304, disregard input from the sensor(s) 304, alert an operator (e.g., via a user interface), or a combination thereof.

In certain embodiments, the controller 330 may use received data from the sensor(s) 304 to control the operation of the reel 221, the header, the cutter bar assembly, another suitable component, or a combination thereof. For example, in some embodiments, the controller 330 may control the hydraulic motor to adjust the rotational speed of the reel 221 of the reel power system 302 based on data received by the sensor(s) 304. Furthermore, in some embodiments, the controller 330 may control a position of the reel 221 relative to the header frame 201 (e.g., by controlling the position of the reel support arms 320) based on data received from the sensor(s) 304.

While the electrical generator(s) 300 mounted to the reel 221 are configured to provide electrical power to the sensor(s) mounted to the reel in the illustrated embodiment, in other embodiments, at least one electrical generator 300 may provide electrical power to other suitable component(s) mounted to the reel, such as light(s), etc. Furthermore, while the sensor(s) receive electrical power from the electrical generator(s) 300 mounted to the reel in the illustrated embodiment, in other embodiments, at least one sensor may receive electrical power from another suitable source (e.g., via a slip ring 326 disposed between the reel 221 and the frame of the header 200).

In certain embodiments, one or more electrical generators 300 may be configured to engage respective reel tine bar(s) 224. In the illustrated embodiment, the wheel 310 of one electrical generator 300 is in contact with a respective reel tine bar 224, and the wheel 310 is configured to be driven to rotate by the reel tine bar 224 as the reel tine bar 224 rotates relative to the support structure. In addition, the body 312 of each electrical generator 300 is non-rotatably coupled to the support structure of the reel 221. As previously discussed, the stator 331 of the electrical generator 300 is non-rotatably coupled to the body, and the rotor 332 of the electrical generator 300 is non-rotatably coupled to the wheel. Accordingly, the rotor 332 is non-rotatably engaged with the reel tine bar. The rotation of the rotor 332 relative to the stator 331 may generate electrical power, which is output by the stator 331 of the electrical generator 300. In certain embodiments, the exterior surface of the wheel may be substantially smooth and configured to engage a corresponding substantially smooth surface of the reel tine bar. However, in other embodiments, the exterior surface of the wheel may have teeth configured to engage corresponding teeth of the reel tine bar.

In the illustrated embodiment, the stator 331 and the rotor 332 are disposed within the body of the electrical generator 300. However, in other embodiments, the body may be omitted, and the stator 331 may be non-rotatably coupled (e.g., directly non-rotatably coupled) to the support structure of the reel. Additionally or alternatively, in certain embodiments, the wheel may be omitted, and the rotor 332 may be non-rotatably coupled (e.g., directly non-rotatably coupled, non-rotatably coupled via the shaft, etc.) to the reel tine bar of the header. While the reel power system 302 includes one generator 300 engaged with a respective reel tine bar of the header in the illustrated embodiment, in other embodiments, the reel power system may include more or fewer electrical generators 300 engaged with respective reel tine bar(s) of the header.

Keeping the foregoing embodiments in mind, mounting generator(s) 300 to the reel 221 enables sensor(s) 304 to be mounted to the reel 221 as well. Accordingly, separate mounting structures for the sensor(s) 304 may be obviated in the foregoing embodiments. Furthermore, the mounting of the generator(s) 300 on the reel 221 may provide a local source of electrical power to the sensor(s) 304. Thus, an electrical connection between generator(s) 300 on the chassis of the harvester 200 and sensor(s) 304 may be obviated in the foregoing embodiments. Keeping these observations in mind, present embodiments may reduce mechanical complexity and manufacturing costs by eliminating the need for superfluous structural mechanisms.

Figure 5:
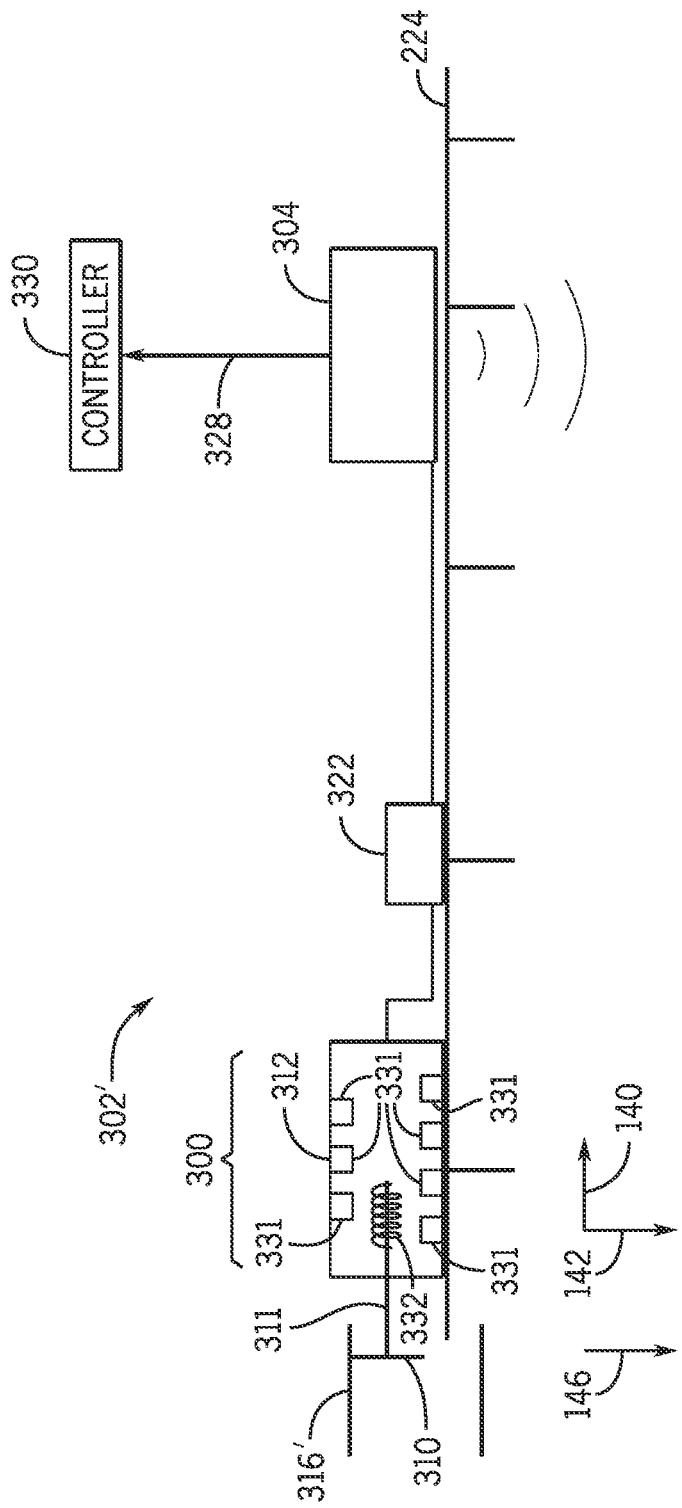
FIG. 5 is a schematic view of an embodiment of the reel power system that may be employed within the header of FIG. 2, in accordance with an embodiment described herein.

FIG. 5 is a schematic view of an embodiment of a reel power system 302' that may be employed within the header 200 of FIG. 2. In the illustrated embodiment, the body 312 of the electrical generator 300 is non-rotatably coupled to the reel tine bar 224. The wheel 310 of the electrical generator 300 is in contact with a tubular structure 316' of the support structure of the reel. As discussed above, the reel tine bar 224 may be driven to rotate. As the reel tine bar 224 rotates, the wheel 310 is driven to rotate by contact with the tubular structure 316', thus driving the shaft 311, which is non-rotatably coupled to the wheel 310, to rotate. Accordingly, the electrical generator 300 may generate electrical power. As previously discussed, the stator 331 of the electrical generator 300 is non-rotatably coupled to the body, and the rotor 332 of the electrical generator 300 is non-rotatably coupled to the wheel. Accordingly, the rotor 332 is non-rotatably engaged with the support structure (e.g., the tubular structure 316' of the support structure). The rotation of the rotor 332 relative to the stator 331 may generate electrical power, which is output by the stator 331 of the electrical generator 300. In certain embodiments, the exterior surface of the wheel 310 may be substantially smooth and configured to engage a corresponding substantially smooth surface of the tubular structure 316'. However, in other embodiments, the exterior surface of the wheel 310 may have teeth configured to engage corresponding teeth of the tubular structure 316'.

While the wheel 310 is configured to engage an interior of the tubular structure 316' in the illustrated embodiment, in other embodiments, the wheel 310 may be configured to engage an exterior of the tubular structure 316'. Furthermore, in the illustrated embodiment, the stator 331 and the rotor 332 are disposed within the body of the electrical generator 300. However, in other embodiments, the body 312 may be omitted, and the stator 331 may be non-rotatably coupled (e.g., directly non-rotatably coupled) to the reel tine bar 224 of the reel. Additionally or alternatively, in certain embodiments, the wheel 310 may be omitted, and the rotor 332 may be non-rotatably coupled (e.g., directly non-rotatably coupled, non-rotatably coupled via the shaft, etc.) to the support structure of the reel (e.g., the tubular structure 316' may be omitted). While the reel power system 302' includes one electrical generator 300 having a stator 331 non-rotatably coupled to a respective reel tine bar in the illustrated embodiment, in other embodiments, the reel power system may include more or fewer electrical generators 300 having stator(s) 331 non-rotatably coupled to respective reel tine bar(s) of the reel.

Additionally, as illustrated, the voltage regulator 322 may be mounted to the reel tine bar 224, and the sensor 304 may be mounted to the reel tine bar 224. The electrical generator 300 may output electrical power to the voltage regulator 322, and the voltage regulator 322 may provide a target electrical power (e.g., voltage and current) to the sensor 304. Because each component is mounted to the reel tine bar 224, the slip ring 326 disclosed above with reference to the embodiment of FIG. 4 is obviated. Therefore, the mechanical complexity and manufacturing cost of the reel power system 302 and the header 200 may be reduced.

The components of FIG. 5 may operate in a similar manner as described in FIG. 4. The voltage regulator 322 may be configured to regulate the electrical power to provide a target electrical power (e.g., current and voltage) to the sensor 304. In this manner, the voltage regulator 322 may account for variations in harvesting operations (e.g., variations in rotational speeds) and, thus, substantially provide the target electrical power to the sensor 304. In some embodiments, the voltage regulator 322 may wirelessly transmit voltage and/or current data (e.g., via Bluetooth, radio frequency, etc.) to the controller 330. The sensor 304 may receive electrical power from the voltage regulator 322, and the electrical power may power the sensor 304. The electrical power may be provided from the electrical generator 300 to the voltage regulator and from the voltage regulator to the sensor by conductors (e.g., wire(s), integrated circuit(s) (IC), etc.). The sensor 304 may include light detection and ranging (LIDAR) sensor(s), radio detection and ranging (radar) sensors(s), optical sensor(s) (e.g., camera(s), etc.), other suitable type(s) of sensor(s), or a combination thereof. The sensor 304 may point generally toward the ground ahead of the header 200 throughout a portion of the rotational range of motion of the reel and a portion of the rotational range of motion of the reel tine bar. The sensor 304 may be configured to wirelessly transmit data to the controller 330 (e.g., via Bluetooth, a radio frequency, etc.).

While the reel power system 302' includes a voltage regulator 322 in the illustrated embodiment, in other embodiments, the voltage regulator 322 may be omitted. Furthermore, while the reel power system 302' includes a single electrical generator 300, a single voltage regulator 322, and a single sensor 304 in the illustrated embodiment, in other embodiments, the reel power system 302' may include additional electrical generator(s) 300, additional voltage regulator(s), additional sensor(s), or a combination thereof. For example, in certain embodiments, an electrical generator 300, a voltage regulator 322, and a sensor 304 may be mounted to each reel tine bar 224.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A reel power system for a header of an agricultural system, comprising:
    an electrical generator comprising a stator and a rotor rotatably engaged with the stator, wherein the stator is configured to be non-rotatably coupled to a support structure of a reel of the header, the rotor is configured to non-rotatably engage a base of the header, the reel is configured to rotate relative to the base, and the electrical generator is configured to generate electrical power in response to rotation of the rotor; and
    a sensor configured to be non-rotatably coupled to a reel tine bar of the reel, wherein the sensor is configured to receive the electrical power from the electrical generator, and the reel tine bar is configured to rotate relative to the support structure.

2. The reel power system of claim 1, wherein the electrical generator comprises a body and a wheel rotatably coupled to the body, the stator and the rotor are disposed within the body, the stator is non-rotatably coupled to the body, the wheel is non-rotatably coupled to the rotor, and the wheel is configured to engage a tubular structure of the base of the header.

3. The reel power system of claim 1, comprising a voltage regulator configured to be non-rotatably coupled to the support structure, wherein the voltage regulator is configured to receive the electrical power from the electrical generator, and the voltage regulator is configured to adjust the electrical power.

4. The reel power system of claim 3, wherein the voltage regulator is configured to wirelessly transmit data to a controller, and the data comprises a value of voltage generated by the electrical generator.

5. The reel power system of claim 1, comprising a slip ring configured to enable the electrical power to flow from the electrical generator to the sensor.

6. The reel power system of claim 1, wherein the sensor is configured to wirelessly transmit data to a controller.

7. A reel power system for a header of an agricultural system, comprising:
an electrical generator comprising a stator and a rotor rotatably engaged with the stator, wherein the stator is configured to be non-rotatably coupled to a reel tine bar of a reel of the header, the rotor is configured to non-rotatably engage a support structure of the reel, the reel tine bar is configured to rotate relative to the support structure, and the electrical generator is configured to generate electrical power in response to rotation of the rotor.

8. The reel power system of claim 7, wherein the generator comprises a body and a wheel rotatably coupled to the body, the stator and the rotor are disposed within the body, the stator is non-rotatably coupled to the body, the wheel is non-rotatably coupled to the rotor, and the wheel is configured to engage a tubular structure of the support structure of the header.

9. The reel power system of claim 7, comprising a voltage regulator configured to be non-rotatably coupled to the reel tine bar, wherein the voltage regulator is configured to receive the electrical power from the generator, and the voltage regulator is configured to adjust the electrical power.

10. The reel power system of claim 9, wherein the voltage regulator is configured to wirelessly transmit data to a controller, and the data comprises a value of voltage generated by the electrical generator.

11. The reel power system of claim 7, comprising a sensor configured to be non-rotatably coupled to the reel tine bar, wherein the sensor is configured to receive the electrical power from the electrical generator.

12. A reel power system for a header of an agricultural system, comprising:
an electrical generator comprising a stator and a rotor rotatably engaged with the stator, wherein the stator is configured to be non-rotatably coupled to a support structure of a reel of the header, the rotor is configured to non-rotatably engage a reel tine bar of the reel, the reel tine bar is configured to rotate relative to the support structure, and the electrical generator is configured to generate electrical power in response to rotation of the rotor.

13. The reel power system of claim 12, wherein the electrical generator comprises a body and a wheel rotatably coupled to the body, the stator and the rotor are disposed within the body, the stator is non-rotatably coupled to the body, the wheel is non-rotatably coupled to the rotor, and the wheel is configured to engage the reel tine bar.

14. The reel power system of claim 12, comprising a voltage regulator configured to be non-rotatably coupled to the support structure, wherein the voltage regulator is configured to receive the electrical power from the electrical generator, and the voltage regulator is configured to adjust the electrical power.

15. The reel power system of claim 14, wherein the voltage regulator is configured to wirelessly transmit data to a controller, and the data comprises a value of voltage generated by the electrical generator.

16. The reel power system of claim 12, comprising a sensor configured to be coupled to the reel, wherein the sensor is configured to receive the electrical power from the electrical generator.

17. The reel power system of claim 16, wherein the sensor is configured to be non-rotatably coupled to the reel tine bar.

18. The reel power system of claim 12, comprising a second electrical generator, wherein the second electrical generator comprises a second stator and a second rotor rotatably engaged with the second stator, the second stator is configured to be non-rotatably coupled to the support structure, the second rotor is configured to non-rotatably engage a base of the header, the reel is configured to rotate relative to the base, and the second electrical generator is configured to generate second electrical power in response to the rotation of the second rotor.

* * * * *